(12) United States Patent
Courtiade et al.

(10) Patent No.: US 10,956,620 B2
(45) Date of Patent: Mar. 23, 2021

(54) METHOD OF MANAGING A SECURE ELEMENT

(71) Applicant: GEMALTO SA, Meudon (FR)

(72) Inventors: Fabien Courtiade, Gemenos (FR); Réda Zaiti, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 318 days.

(21) Appl. No.: 16/315,007

(22) PCT Filed: Jun. 14, 2017

(86) PCT No.: PCT/EP2017/064498
§ 371 (c)(1),
(2) Date: Jan. 3, 2019

(87) PCT Pub. No.: WO2018/010904
PCT Pub. Date: Jan. 18, 2018

(65) Prior Publication Data
US 2019/0311155 A1 Oct. 10, 2019

(30) Foreign Application Priority Data
Jul. 13, 2016 (EP) .................................. 16305906

(51) Int. Cl.
*G06F 21/74* (2013.01)
*G06F 21/44* (2013.01)
(Continued)

(52) U.S. Cl.
CPC .............. *G06F 21/74* (2013.01); *G06F 21/44* (2013.01); *G06F 21/77* (2013.01); *H04W 4/80* (2018.02);
(Continued)

(58) Field of Classification Search
CPC ... G06F 21/74; G06F 21/77; H04W 12/00407
See application file for complete search history.

(56) References Cited

U.S. PATENT DOCUMENTS 8,429,409 B1    4/2013  Wall et al.
9,400,888 B1 *  7/2016  Banthia ................... H04L 1/188
(Continued)

FOREIGN PATENT DOCUMENTS

EP           2608478 A1      6/2013

OTHER PUBLICATIONS

Anwar, Waqar; Lindskog, Dale; Zavarsky, Pavol; Ruhl, Ron; "Redesigning Secure Element Access Control for NFC Enabled Android Smartphones using Mobile Trusted Computing", International Conference on Information Society (i-Society), IEEE, Jun. 24-26, 2013, pp. 27-34.*

(Continued)

*Primary Examiner* — Victor Lesniewski
(74) *Attorney, Agent, or Firm* — Buchanan Ingersoll & Rooney PC

(57) ABSTRACT

A method for managing a secure element embedded in an equipment comprising an NFC controller. The secure element comprises a security indicator. The method comprises the steps of: on receipt of a triggering command sent by the NFC controller, the secure element switches in a test context; on receipt of a restore command sent by an application, the secure element sets the security indicator, such as a counter of unusual events, to a predefined value only if the secure element is in test context; and on receipt of an ending command sent by the NFC controller, the secure element switches in a Live context. The secure element keeps a track of the switch in the test context and denies any further triggering commands. The method enables reset of security (Continued)

indicator after manufacturing and test where the security indicator may have been affected.

13 Claims, 2 Drawing Sheets

(51) Int. Cl.
  *H04W 4/80*   (2018.01)
  *H04W 12/06*   (2021.01)
  *H04W 12/10*   (2021.01)
  *H04W 12/47*   (2021.01)
  *H04W 12/00*   (2021.01)
  *G06F 21/77*   (2013.01)

(52) U.S. Cl.
  CPC ........... *H04W 12/00* (2013.01); *H04W 12/06* (2013.01); *H04W 12/10* (2013.01); *H04W 12/47* (2021.01)

(56) References Cited

U.S. PATENT DOCUMENTS

| | | | |
|---|---|---|---|
| 2012/0096547 A1 | 4/2012 | Barau et al. | |
| 2012/0172016 A1* | 7/2012 | Veneroso | H04W 12/0608 455/414.1 |
| 2012/0238207 A1* | 9/2012 | Marcovecchio | H04W 12/0806 455/41.1 |
| 2012/0260119 A1* | 10/2012 | Garnier | G06F 21/81 713/340 |
| 2013/0097348 A1* | 4/2013 | Milbrandt | G06F 21/74 710/110 |
| 2013/0143489 A1* | 6/2013 | Morris | H04B 5/0056 455/41.1 |
| 2014/0154979 A1* | 6/2014 | Tomas | G06Q 20/3278 455/41.1 |
| 2014/0201815 A1* | 7/2014 | Van Nieuwenhuyze | H04W 12/1206 726/4 |
| 2014/0298411 A1* | 10/2014 | Castell | H04W 12/08 726/2 |
| 2015/0096045 A1* | 4/2015 | Watson | G06Q 20/3226 726/26 |
| 2017/0124330 A1* | 5/2017 | Van Nieuwenhuyze | G06F 21/575 |
| 2017/0142159 A1* | 5/2017 | Li | H04B 5/0031 |
| 2017/0337390 A1* | 11/2017 | Hamilton | H04L 9/0861 |

OTHER PUBLICATIONS

Reveilhac, Marie; Pasquet, Marc; "Promising Secure Element Alternatives for NFC Technology", First International Workshop on Near Field Communication, IEEE, Feb. 24, 2009, pp. 75-80.*

ETSI TS 102 613, V7.6.0, "Smart Cards; UICC—Contactless Front-end (CLF) Interface; Part 1 : Physical and data link layer characteristics (Release 7)", Jun. 2009, pp. 1-56.

International Search Report (PCT/ISA/210) dated Aug. 25, 2017, by the European Patent Office as the International Searching Authority for International Application No. PCT/EP2017/064498.

Written Opinion (PCT/ISA/237) dated Aug. 25, 2017, by the European Patent Office as the International Searching Authority for International Application No. PCT/EP2017/064498.

* cited by examiner

METHOD OF MANAGING A SECURE ELEMENT

FIELD OF THE INVENTION

The present invention relates to methods of managing a secure element embedded in an equipment. It relates particularly to methods of securely managing the content of a secure element.

PRIOR ART

Secure elements are small devices comprising a memory, a microprocessor and an operating system for computing treatments. Such secure elements may comprise a plurality of memories of different types, like non-volatile memory and volatile memory. They are called "secure" because they are able to control the access to the data they contain and to authorize or not the use of data by other machines. The secure elements may also provide computation services based on cryptographic components. In general, secure elements have limited computing resources and limited memory resources and they are intended to be connected to a host machine which provides them with electric power. Secure elements may be removable or fixed to a host machine. For example, smart cards and embedded secure element as defined by Global platform Card Specification v2.3 or JavaCard v3.0.5 are kind of secure elements.

A secure element may have a security mechanism aiming at detecting attacks. Such security mechanisms generally decrement a counter which reflects the number of detected unusual events. During tests which are performed at the equipment production stage, several events (like power on/off of the hosting terminal or other hardware components) may generate unexpected voltage values which are considered as suspect events. In this case the security mechanism may decrement its counter and the secure element may be permanently locked when the counter reaches a preset threshold.

There is a need for allowing to securely reset a security counter in a secure element before it reaches its locking threshold at the equipment production stage.

SUMMARY OF THE INVENTION

An object of the invention is to solve the above mentioned technical problem.

An object of the present invention is a method for managing a secure element embedded in an equipment that comprises a NFC controller. The secure element comprises a security indicator. The method comprises the following steps:
  on receipt of a triggering command sent by the NFC controller, the secure element switches in a test context,
  on receipt of a restore command sent by an application, the secure element sets the security indicator to a predefined value only if the secure element is in test context, and
  on receipt of an ending command sent by the NFC controller, the secure element switches in an Live context. The secure element keeps a track of the switch in the test context and denying any further triggering commands.

Advantageously, the secure element may set the security indicator to the predefined value only if the application successfully authenticated to the secure element.

Advantageously, the secure element may send a specific message to the NFC controller when the security indicator has been set to the predefined value and the NFC controller may send the ending command in response to the receipt of the specific message.

Advantageously, on receipt of a switch command sent by an administration equipment, the NFC controller may switches in a test mode and send the triggering command to the secure element. The NFC controller may automatically switch in a Live mode after sending the ending command.

Advantageously, the application may be hosted by either the equipment or an external computer (i.e. distinct from the equipment).

Another object of the invention is a NFC controller configured to send a triggering command to a secure element for requesting that said secure element switches in a test context. The NFC controller is configured to send an ending command to the secure element for requesting that said secure element permanently switches in a Live context.

Advantageously, the NFC controller may be configured to send the ending command in response to the receipt of a specific message received from the secure element.

Advantageously, the NFC controller may be configured to switch in a test mode and to send the triggering command to the secure element on receipt of a switch command sent by an administration equipment. The NFC controller may be configured to automatically switch in a Live mode after sending the ending command.

Advantageously, the NFC controller may be configured to keep a track of the switch in the Live mode and to deny any further triggering commands.

Another object of the invention is a secure element comprising a security indicator and configured to switch in a test context on receipt of a triggering command received from a NFC controller The secure element is configured to, on receipt of a restore command received from an application, set the security indicator to a predefined value only if the secure element is in test context. The secure element is configured to switch in a Live context on receipt of an ending command received from the NFC controller. The secure element is configured to keep a track of the switch in the test context and to deny any further triggering commands.

Advantageously, the secure element may be configured to set the security indicator to the predefined value only if the application successfully authenticated to the secure element.

Another object of the invention is an equipment comprising a NFC controller according to the invention and a secure element according to the invention. The equipment comprises an application configured to both authenticate to the secure element and to send a restore command to the secure element to request that the secure element sets the security indicator to a predefined value.

Advantageously, the equipment may be a mobile phone, a connected watch, a device embedded in a Personal Computer or a tablet.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The NFC (Near Field Communication) technology is based on the exchanging of data via a magnetic field. For example, ISO14443 and ISO18092 standards provide modulation technologies and communication protocols which may be used in NFC domain.

A NFC controller is a hardware module also named ContactLess Front-end chip or Contactless Frontend (CLF). Typically, a Contactless Frontend is a circuitry which handles the analogue part of the contactless communication, handles the communication protocol layers of the contactless transmission link and exchanges data with the UICC or secure element. The invention may apply to any types of NFC controller which are able to communicate with a secure element.

The invention applies to any types of equipment which embed a NFC controller and a secure element. The invention applies to any kind of NFC-enabled equipment, For example, it applies to a terminal equipment or portable devices like mobile phone, tablet, connected watches, personal computer, gaming machine or Electronic Funds Transfer Terminals for payment. It applies to a device or a box embedded in computer. It also applies to vehicles like car and to any computer machine equipped with a NFC controller and a secure element.

The invention relies on the fact that the NFC controller is adapted to control the current context of the secure element. In a first context (called Operating context, Live context or Field context) the security indicator stored in the secure element cannot be reset. In a second context (called Test context) the security indicator stored in the secure element may be reset.

Figure 1:
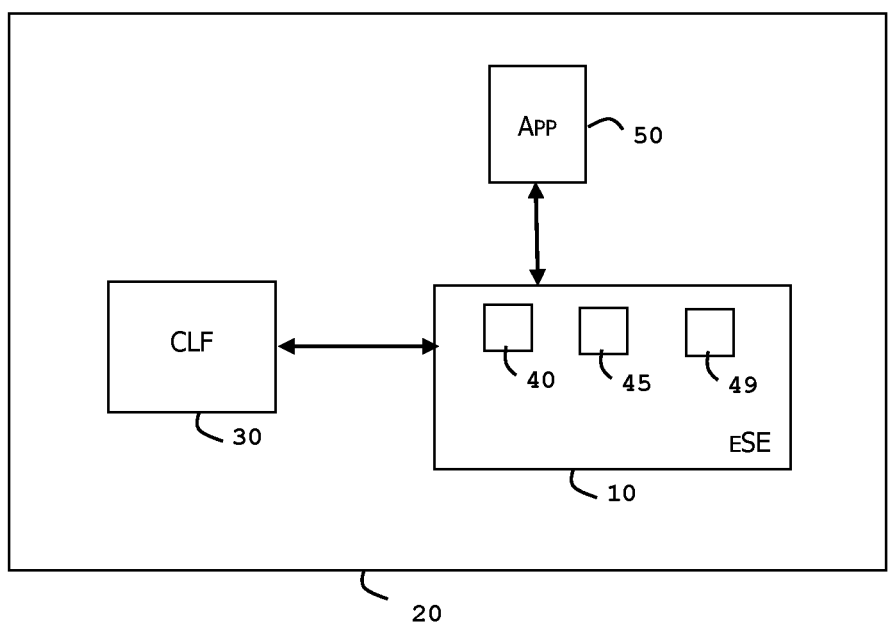
FIG. 1 depicts schematically an example of architecture of an equipment comprising a NFC controller and a secure element according to the invention.

FIG. 1 shows an example of architecture of an equipment comprising a NFC controller and a secure element according to the invention.

The equipment 20 may be a Mobile phone. The NFC controller 30 is connected to both an antenna (not shown) and a secure element 10.

The secure element 10 comprises a security indicator 40 and a registry 45.

In the present description, the word registry means a system for keeping a record of items. For instance, the registry may be implemented as a database, one or several files, one or several registers, or as one or several software containers.

The security indicator 40 may be an error counter, a security counter reflecting the number of detected hostile events, or an authentication flag for example. It may also be implemented as a plurality of counters, flags, files or registers. The security indicator 40 has a value which is intended to evolve to reflect some kind of events during the life of the secure element.

The equipment 20 includes the NFC controller 30, the secure element 10 and a software application 50 which is designed to communicate with the embedded secure element 10.

In a preferred embodiment, the secure element 10 is an embedded secure element (eSE) comprising a processor, a non-volatile memory and an operating system.

Alternatively, the secure element 10 may be a Secure Digital (SD) card, a miniSD card, a microSD card, an embedded Universal Integrated Circuit Card (eUICC), a smart card, an integrated secure element (iSE) or even a software secure element.

The NFC controller 30 and the secure element 10 are linked by a direct single wire link which allows a communication in contact mode between the NFC controller 30 and the secure element 10. In a preferred embodiment, both the NFC controller 30 and the secure element 10 use the Single Wire protocol (SWP) as defined by TS 102.613.

The secure element 10 comprises a software application 49 which is in charge of updating the security indicator 40. The software application 49 may be implemented as an applet in Javacard® language for instance. Alternatively, the software application 49 may be part of the operating system of the secure element 10.

The secure element 10 is designed to work in at least two distinct contexts: the Live context and the Test context. When working in Live context, the secure element denies all attempts to reset the security indicator 40. When working in Test context, the secure element may accept to reset the security indicator 40 if additional security conditions are fulfilled. The secure element 10 is designed to switch a single time in Test context and to refuse all further attempts to switch in Test context.

The NFC controller 30 is adapted to send a triggering command 60 to the secure element 10 in order to request that the secure element 10 switches in the Test context. For instance, the triggering command 60 can be the ANY_SET_PARAMETER( ) command as defined by TS_102 622 v120100 with a specific parameter value dedicated to the request to switch to test context.

The NFC controller 30 is also adapted to send an ending command 65 to the secure element 10 in order to request that the secure element 10 permanently switches in the Live context. For instance, the ending command 65 can be the ANY_SET_PARAMETER( ) command with a specific parameter value dedicated to the request to switch to Live context.

The NFC controller 30 may be adapted to send the ending command 65 to the secure element 10 in response to the receipt of a specific message 64 coming from the secure element 10. For instance, the specific message 64 can be the EVENT_TRANSACTION( ) command as defined by ts_102 622 v120100 with a specific parameter value dedicated to inform the CLF 30 that a switch to the Live context is needed.

The NFC controller 30 may be designed to work in at least two distinct modes: the Live and the Test modes. The Live mode is also called Operating mode or Field mode. When working in Live mode, the NFC controller 30 cannot send any commands requesting a change of context of the secure element 10. When working in test mode, the NFC controller 30 monitors the current context of the secure elements 10.

The NFC controller 30 may be adapted to both switch in Test mode and automatically send the triggering command 60 to the secure element 10 on receipt of a switch command 66 received from an administration equipment 80. For instance, the switch command 66 can be the conveyed through USB connection or a TCP/IP connection (dedicated socket used) with a specific parameter value dedicated to inform the CLF 30 that it must switch to test mode.

The administration equipment 80 may be a Production computer or a test platform including at least one computer. Additionally, the NFC controller 30 may be adapted to automatically switch back in Live mode after sending the ending command 65 to the secure element 10.

Optionally, the NFC controller 30 may be configured to switch in Test mode only once.

The secure element 10 is configured to switch in test context on receipt of the triggering command 60 sent by the NFC controller 30. It should be noted that the secure element 10 accepts the triggering command 60 only if this command is received through the physical interface dedicated to the communication with the CLF.

In response to the restore command 63 sent by the application 50, the secure element 10 is configured to set the security indicator 40 to a predefined value only if the secure element 10 is currently in test context. It should be noted that the secure element 10 accepts the restore command 63 only if this command is received through the physical interface dedicated to the communication with the application 50.

The restore command 63 may be a dedicated command sent in the form of APDU as defined by ISO 7816-3/4.

The software application 49 is designed to check the content of the registry 45 in order to verify that the current context is the Test context. It is to be noted that the software application 49 has access rights to read the registry 45. The entity (i.e. Operating System of the secure element 10 which is authorized to run the Triggering command 60 and the entity (i.e. application 49) which is authorized to reset the security indicator 40 share a piece of information reflecting the current context through the registry 45.

On receipt of the ending command 65 sent by the NFC controller 30, the secure element 10 is configured to switch in Live context.

The secure element 10 is configured to keep a track of the switch in Test context and to deny any further triggering commands. In other words, the secure element 10 can switch to test context only once. The secure element 10 can be adapted to store a context indicator in the registry 45.

Preferably, the secure element 10 is configured to set the security indicator 40 to the predefined value only if the application 50 successfully authenticated to the secure element 10. The authentication can be performed using well-known mechanisms as static authentication or mutual authentication.

The predefined value can be the default value of the security indicator 40.

Optionally, the secure element 10 may be adapted to send a specific message 64 to the NFC controller as soon as the security indicator 40 has been restored to the predefined value.

Optionally, the context indicator (reflecting the current context) and the switch indicator (reflecting that a switch to Test context occurred) can be stored in two distinct registries.

Advantageously, when powered, the secure element 10 is configured to start in Live context regardless its last current context. Thus the indicator of current context may be overwritten during the starting stage of the secure element 10.

The application 50 may be designed to run in Android® environment, iOS® environment or with any operating system running on the equipment 20.

Optionally, the application 50 may be a standalone software application or a proxy application routing commands to the NFC controller 30.

In another embodiment, the application 50 may be located in another computer. (i.e. outside the equipment 20). For example, the application 50 may be hosted by a NFC-enabled computer or a NFC reader able to send contactless commands to the secure element 10 through the CLF 30.

The software application 49 may include the predefined value in its own code (hard-coded) or may retrieve the predefined value from another area of the non-volatile memory of the secure element 10.

Figure 2:
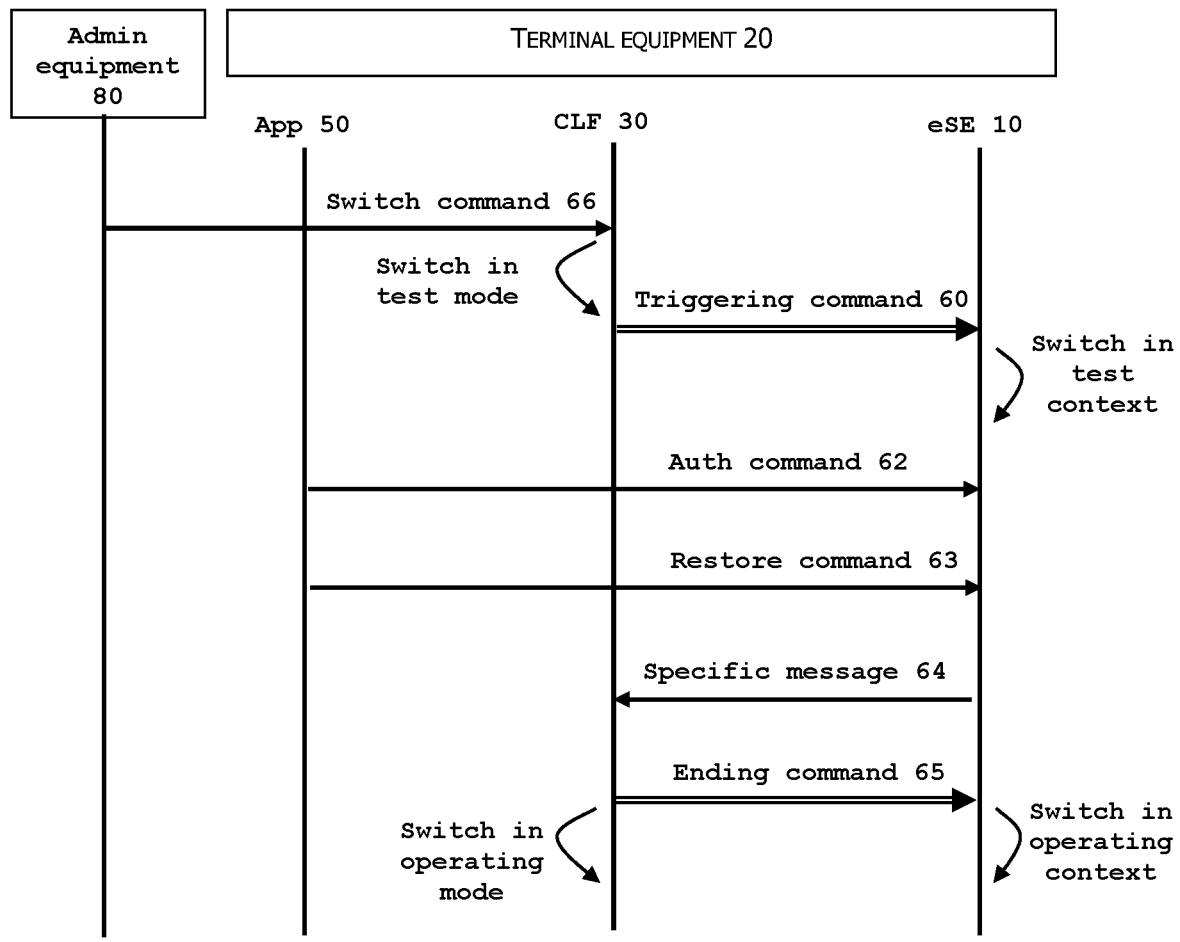
FIG. 2 depicts schematically an example of message exchanges allowing to reset a security indicator stored in an embedded secure element according to the invention.

FIG. 2 shows an example of message sequence allowing to reset a security indicator stored in an embedded secure element according to the invention.

The NFC controller 30, the secure element 10, the application 50, the equipment 20 and the administration equipment 80 are assumed to be similar to those described at FIG. 1.

In a first embodiment, the secure element 10 is assumed to be in Live context and has never switch to Test context. The NFC controller 30 sends a Triggering command 60 to the secure element 10. The secure element 10 executes the Triggering command 60 and thus switches to Test context and updates the registry 45 to record the new current context and the fact that the test context has been activated.

Then the secure element 10 receives a restore command 63 sent by the application 50. The secure element checks that the current context is the Test context (by checking the registry 45) and sets the security indicator 40 to a predefined value since the secure element 10 is currently in Test context. If the current context was the Live context, the secure element 10 would deny the update of the security indicator 40. The secure element 10 can send a response to the restore command 63 so that the application 50 is aware of the execution result. Optionally, the receipt of this response may trigger the uninstallation of the application 50 from the equipment 20.

Then the NFC controller 30 sends an ending command 65 to the secure element which permanently switches in Live context.

Advantageously, the application 50 and the software application 49 may update a command counter which is increment each time a command is send between them and which avoids replay of sensitive commands by the secure element.

In a second embodiment, in addition to actions performed in the first embodiment, the secure element 10 automatically sends a specific message 64 to the NFC controller 30 after the update of the security indicator 40. This specific message 64 is intended to inform the CLF 30 that the secure element 10 has no more action to perform in Test context. The receipt of the specific message 64 by the CLF 30 triggers the sending of the ending command 65 by the NFC controller 30. Thus the NFC controller 30 fully monitors the current context of the secure element 10.

In a third embodiment, in addition to actions performed in the first or second embodiment, the application 50 sends an authentication command 62 to the secure element 10. For instance, the application 50 may send an AUTHENTICATE command.

In this embodiment, the secure element checks that the application 50 successfully authenticated before updating the security indicator 40 and denies the reset of the security indicator 40 in case of lack of authentication.

Advantageously, the application 50 may send a Select command (as defined by Global platform Card Specifications v2.3) to the security element 10 in order to select the software application 49. In this case, the authentication command 62 can be treated by the application 49.

Optionally, the application 50 may send a Read command to the software application 49 to get the current value of the security indicator 40.

In a fourth embodiment, in addition to actions performed in any of the previously presented embodiments, the administration equipment 80 may send a switch command 66 to the NFC controller 30 for requesting the CFL to switch in Test mode. The NFC controller 30 switches in Test mode and automatically sends the triggering command 60 to the secure element 10.

The capability of the NFC controller 30 to treat the Switch command 66 is disabled when the CLF 30 switches to the Live mode. Thus the switch command 66 cannot be used after Test mode has been used once on CLF side.

Preferably, the administration equipment 80 may send the switch command 66 to the NFC controller 30 through a contact communication interface. Alternatively, the administration equipment 80 may send the switch command 66 through the contactless communication interface of the CLF 30.

The administration equipment 80 may also send another switch command to the application 50 to synchronize the process of resetting the security indicator.

In this embodiment, the NFC controller 30 automatically switches back when sending the ending command 65 to the secure element. (Preferably just after sending the command)

The invention is not restricted to a single secure element monitored by the CLF. The NFC controller 30 can manage the context of several secure elements hosted by the equipment 20. For example the NFC controller may have 2 or 3 SWP links connected to as many secure elements.

Thanks to the invention, the lifecycle of the secure element remains unchanged and may remain compliant with Global Platform Card Specifications v2.3 specifications.

The invention allows to prevent unauthorized access to the security indicator in the field.

Thanks to the invention, collaboration between the NFC controller which monitors the secure element context and the application 50 which is entitled to request the update of the security indicator provides an enhanced security framework. It is to be noted that the NFC controller and the application 50 use their own logical channel to communicate with the secure element.

In one embodiment, the application 50 may use the CLF 30 as a pass-through in order to communicate with the secure element 10. In this case the NFC controller 30 routes the messages in both directions between the application 50 and the secure element 10.

It must be understood, within the scope of the invention, that the above-described embodiments are provided as non-limitative examples. In particular, the equipment may comprise any number of secure elements managed according to the invention.

The invention is not limited to the described embodiments or examples. In particular, the features described in the presented embodiments and examples may be combined.

The architecture of the equipment 20 and the architecture of the secure element shown at FIG. 1 are provided as examples only. These architectures may be different.

The invention is well-suited for managing non-removable secure elements.

The invention claimed is:

1. A computer-implemented method for managing a secure element embedded in an equipment comprising an NFC controller, said secure element comprising a security indicator,
    wherein said method comprises the steps:
        on receipt of a triggering command sent by the NFC controller, the secure element switches in a test context in which the secure element may accept to reset the security indicator,
        on receipt of a restore command sent by an application, the secure element sets the security indicator to a predefined value only if the secure element is in test context,
        on receipt of an ending command sent by the NFC controller, the secure element switches in a Live context in which the secure element denies any attempt to reset the security indicator, said secure element keeping a track of the switch in the test context and denying any further triggering commands.

2. A method according to claim 1, wherein the secure element set the security indicator to the predefined value only if the application successfully authenticated to the secure element.

3. A method according to claim 1, wherein the secure element sends a specific message to the NFC controller when the security indicator has been set to the predefined value and wherein the NFC controller sends the ending command in response to the receipt of the specific message.

4. A method according to claim 1, wherein on receipt of a switch command sent by an administration equipment, the NFC controller switches in a test mode and sends the triggering command to the secure element and wherein the NFC controller automatically switches in a Live mode after sending the ending command.

5. A method according to claim 1, wherein the application is hosted by either the equipment or an external computer.

6. A secure element comprising a security indicator, wherein on receipt of a triggering command received from an NFC controller, the secure element is configured to switch in a test context in which the secure element may accept to reset the security indicator, wherein on receipt of a restore command received from an application, the secure element is configured to set the security indicator to a predefined value only if the secure element is in test context, wherein on receipt of an ending command received from the NFC controller, the secure element is configured to switch in a Live context in which the secure element denies any attempt to reset said security indicator and wherein said secure element is configured to keep a track of the switch in said test context and to deny any further triggering commands.

7. A secure element according to claim 6, wherein the secure element is configured to set the security indicator to the predefined value only if the application successfully authenticated to the secure element.

8. An equipment comprising a secure element according to claim 6 and an NFC controller which is configured to send the triggering command to the secure element requesting that said secure element switches in the test context, and wherein said NFC controller is configured to send the ending command to the secure element for requesting that said secure element permanently switches in the Live context.

9. An equipment according to claim 8, wherein said equipment comprises an application configured to both authenticate to the secure element and to send a restore command to the secure element to request that the secure element sets the security indicator to a predefined value.

10. An equipment according to claim 8, wherein the NFC controller is configured to send the ending command in response to the receipt of a specific message received from the secure element.

11. An equipment according to claim 8, wherein the NFC controller is configured to switch in a test mode and to send the triggering command to the secure element on receipt of a switch command sent by an administration equipment and wherein the NFC controller is configured to automatically switch in a Live mode after sending the ending command.

12. An equipment according to claim 11, wherein the NFC controller is configured to keep a track of the switch in said Live mode and to deny any further triggering commands.

13. An equipment according to claim 8, wherein the equipment is a mobile phone, a connected watch, a tablet or an electronic device embedded in a computer.

* * * * *